(12) United States Patent
Peden et al.

(10) Patent No.: US 9,014,343 B1
(45) Date of Patent: Apr. 21, 2015

(54) RECALLING USER-GENERATED MESSAGES

(75) Inventors: Mark Douglas Peden, Olathe, KS (US); Gary Duane Koller, Overland Park, KS (US); Raymond Emilio Reeves, Olathe, KS (US); Simon Youngs, Overland Park, KS (US); Piyush Jethwa, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 616 days.

(21) Appl. No.: 13/034,393

(22) Filed: Feb. 24, 2011

(51) Int. Cl.
*H04M 1/64* (2006.01)
*H04M 3/533* (2006.01)

(52) U.S. Cl.
CPC .................................. *H04M 3/533* (2013.01)

(58) Field of Classification Search
USPC ........ 379/88.25, 142.06, 67.1, 88.26, 106.09, 379/93.01, 88.13, 88.22
See application file for complete search history.

(56) References Cited

U.S. PATENT DOCUMENTS

| | | | |
|---|---|---|---|
| 6,490,614 B1 | 12/2002 | Shaffer et al. | |
| 6,781,962 B1 | 8/2004 | Williams et al. | |
| 6,978,316 B2 | 12/2005 | Ghaffar et al. | |
| 7,697,667 B1 | 4/2010 | Wageman et al. | |
| 8,055,713 B2 | 11/2011 | Simske et al. | |
| 8,255,470 B2 * | 8/2012 | Jackson et al. | 709/206 |
| 2004/0186884 A1 * | 9/2004 | Dutordoir | 709/206 |
| 2005/0124360 A1 | 6/2005 | Choi | |
| 2006/0239424 A1 | 10/2006 | Walter | |
| 2007/0286354 A1 * | 12/2007 | Shaffer et al. | 379/67.1 |
| 2009/0013087 A1 * | 1/2009 | Lorch et al. | 709/232 |
| 2009/0271486 A1 | 10/2009 | Ligh | |
| 2010/0325470 A1 | 12/2010 | Underwood | |

OTHER PUBLICATIONS

Non-Final OA, in related case U.S. Appl. No. 13/152,424, mailed Mar. 19, 2013, 22 pgs.

* cited by examiner

*Primary Examiner* — Yosef K Laekemariam

(57) ABSTRACT

A method, system, and medium are provided for facilitating message recalls. One embodiment includes receiving an indication that a message has been communicated in association with a user device. A confirmation message is communicated to the user device. The confirmation message includes a recall option that, if selected, initiates a recall of the voice message. An indication of a user selection of the recall option is received and, thereafter, a recall of the message is initiated.

16 Claims, 7 Drawing Sheets

| SENT MESSAGES | | | | |
|---|---|---|---|---|
| RECALL | TO | SUBJECT | COMMUNICATION METHOD | SENT |
| ☐ | RECIPIENT 1 | MESSAGE 1 | EMAIL | 1/1/2011 |
| ☐ | RECIPIENT 2 | MESSAGE 2 | TEXT MESSAGE | 1/3/2011 |
| ☐ | RECIPIENT 3 | MESSAGE 3 | VOICE MESSAGE | 1/3/2011 |
| ... | ... | ... | ... | ... |

☐ RECALL LOG
☐ RECALL BY CATEGORY

FIG. 2

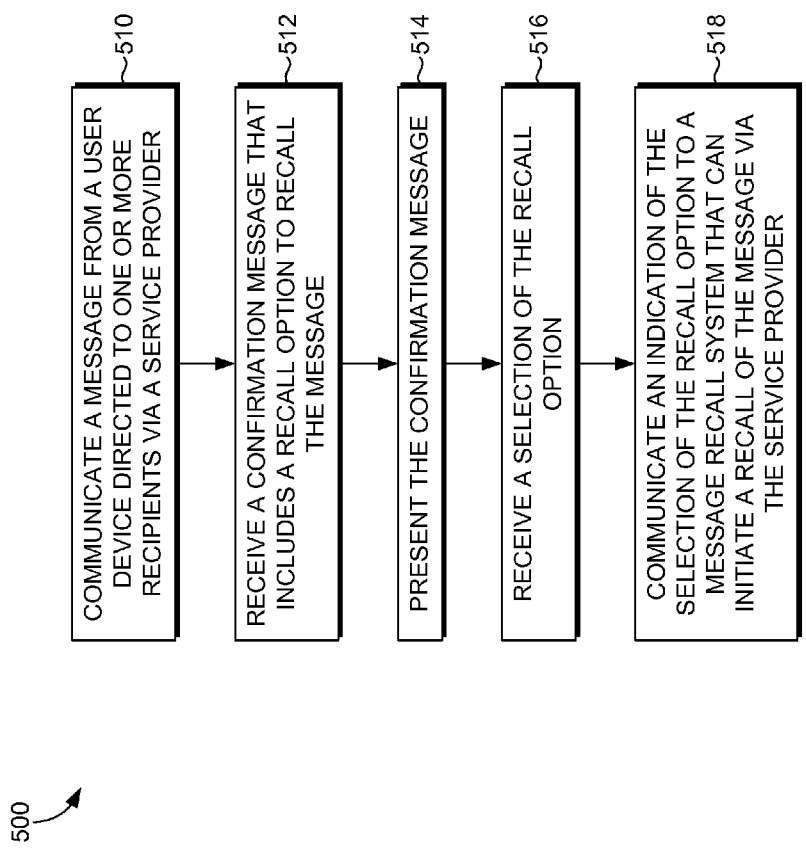

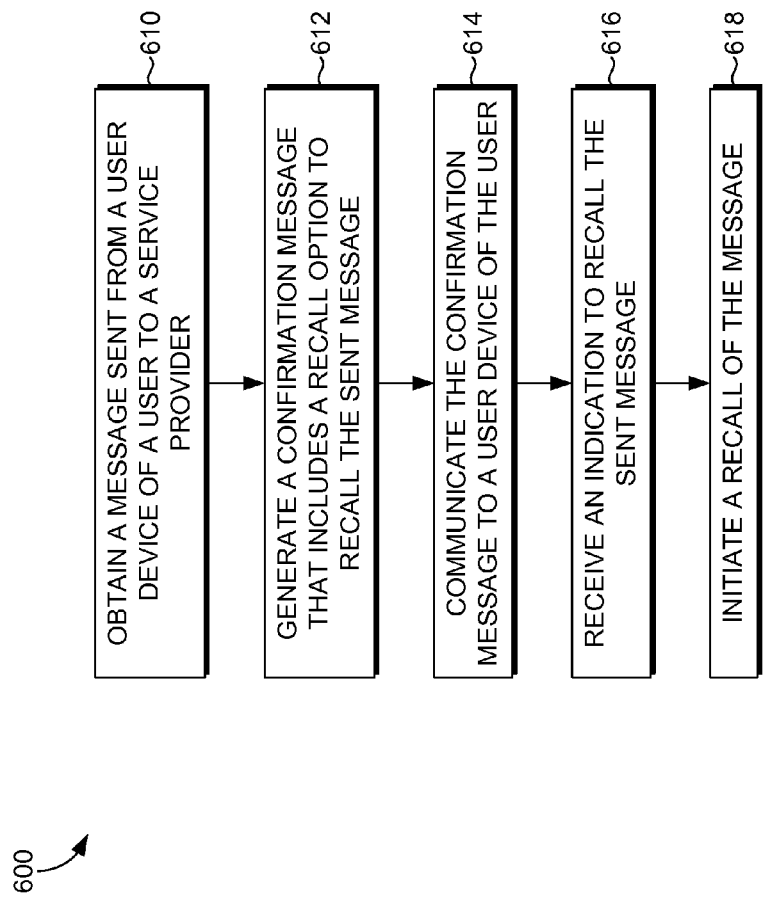

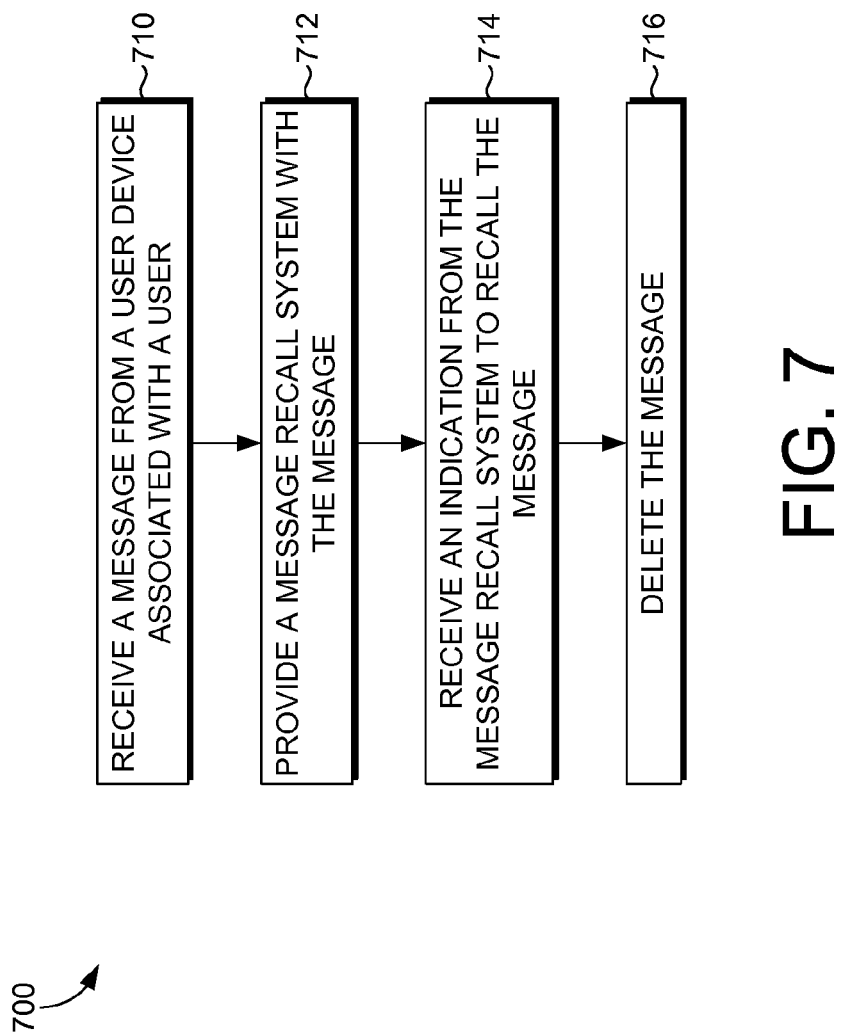

US 9,014,343 B1

RECALLING USER-GENERATED MESSAGES

SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, managing messages communicated in association with a user. In this regard, user-generated messages sent in connection with a user via any number of services providers (e.g., a voice service provider, a text message service provider, an email service provider, an instant message service provider, etc.) can be managed via a single message recall system. Such a message recall system enables a user to initiate a recall of a message or set of messages.

BRIEF DESCRIPTION OF THE SEVERAL VIEWS OF THE DRAWINGS

Illustrative embodiments of the present invention are described in detail below with reference to the attached drawing figures, and wherein:

FIG. 2 provides an exemplary user interface for managing messages, in accordance with an embodiment of the present invention;

FIG. 5 provides a first exemplary method for facilitating message recalls using confirmation messages, in accordance with an embodiment of the present invention;

FIG. 6 provides a second exemplary method for facilitating message recalls using confirmation messages according to embodiments of the present invention; and FIG. 7 provides an exemplary method for recalling messages.

DETAILED DESCRIPTION

Figure 1:
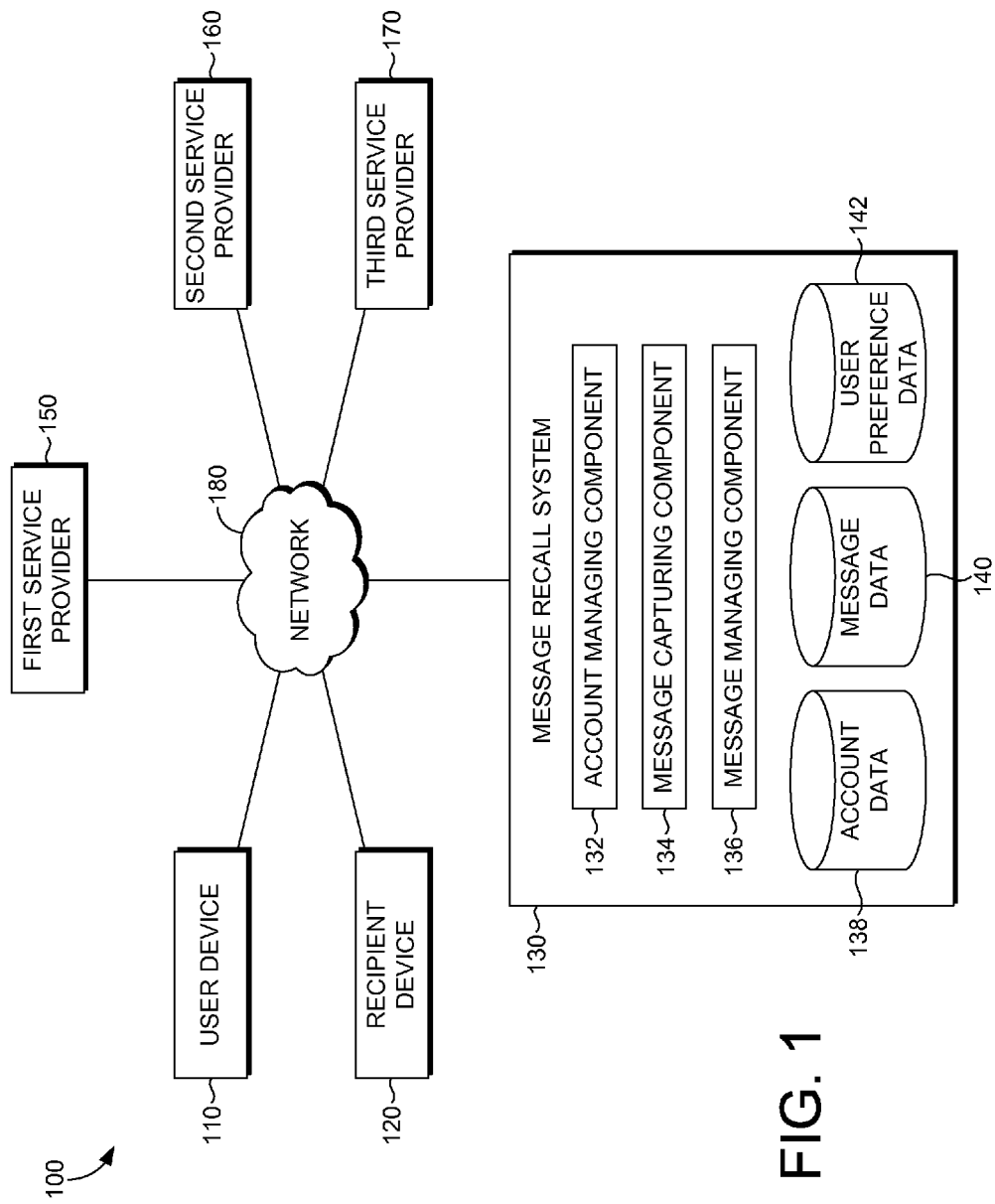
FIG. 1 is a block diagram of an exemplary computing system 100 that is suitable for operation of an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended for the purpose of providing an easy methodology of communicating the ideas expressed herein and are not meant to limit the scope of the present invention. The following is a list of these acronyms:

3G Third-Generation Wireless Telephone Technology
4G Fourth-Generation Wireless Telephone Technology
API Application Programming Interface
CDMA Code Division Multiple Access
CD-ROM Compact Disk Read Only Memory
DVD Digital Versatile Discs
EEPROM Electrically Erasable Programmable Read Only Memory
GPRS General Packet Radio Service
GSM Global System for Mobile Communications
iDEN Integrated Digital Enhanced Network
IP Internet Protocol
PC Personal Computer
PCS Personal Communications Service
PDA Personal Digital Assistant
RAM Random Access Memory
ROM Read Only Memory
SMS Short Message Service
TDMA Time Division Multiple Access
UMTS Universal Mobile Telecommunications Systems
WiMAX Worldwide Interoperability for Microwave Access Further, various technical terms are used throughout this description. An illustrative resource that fleshes out various aspects of these terms can be found in Newton's Telecom Dictionary by H. Newton, $24^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention are directed to managing user-generated messages sent from one or more user devices associated with a user. In this regard, embodiments of the present invention enable a sender of messages to manage messages intended for a recipient(s) that have been communicated, transmitted, or delivered to a service provider or the recipient(s). As discussed more fully below, such messages may be, for example, voicemail messages, social network messages, text messages (e.g., SMS messages), instant messages, electronic messages, and/or the like. Accordingly, a user (i.e., message sender) can maintain current information regarding various messages intended for delivery to recipients and more easily recall messages delivered to service providers and/or recipients if so desired. For example, assume that a user leaves a voicemail message for a particular recipient while the recipient initiates a return call to the user. In such a case, the user can view and/or recall the voicemail message, if so desired, using embodiments of the present invention. For instance, the user may wish to recall the voicemail message as the voicemail left for the recipient may be outdated, unnecessary, or irrelevant.

Accordingly, in one aspect, the present invention is directed to one or more computer-readable media having computer-useable instructions embodied thereon for performing a method for facilitating message recalls. The method includes receiving an indication that a voice message has been communicated in association with a user device. A confirmation message is communicated to the user device. The confirmation message includes a recall option that, if selected, initiates a recall of the voice message. An indication of a user selection of the recall option is received, and recalling the voice message is initiated.

In another aspect, the present invention is directed to a graphical user interface for recalling messages. The graphical user interface includes a first display area for displaying a set of message identifiers that identify messages sent in association with a user, wherein at least one of the messages comprises a first type of message and at least one of the messages comprises a second type of message. The graphical user interface also includes a second display area for displaying a recall option to initiate a recall of one or more messages associated with the set of message identifiers.

In yet another aspect, the present invention one or more computer-readable media having computer-useable instructions embodied thereon for performing a method for facilitating message recalls. The method includes obtaining a first message of a first type from a first service provider, the first message associated with a user, and obtaining a second message of a second type from a second service provider, the second message associated with the user. An indication to recall the first message is received. Account data associated with the first service provider is utilized to initiate a recall of the first message that deletes the first message from the first service provider.

Referring to the drawings generally, and initially to FIG. 1 in particular, an exemplary computing system 100 for practicing an embodiment of the present invention is provided. It will be understood and appreciated by those of ordinary skill in the art that the computing system 100 shown in FIG. 1 is merely an example of one suitable computing system and is not intended to suggest any limitation as to the scope of use or functionality of the present invention. Neither should the computing system 100 be interpreted as having any dependency or requirement related to any single component or combination of components illustrated therein. The single unit depictions are meant for clarity, not to limit the scope of embodiments in any form. For example, although a first service provider 150, a second service provider 160, and a third service provider 170 is illustrated, computing system 100 can include any number of service providers that provide message communication services to the user device 110.

As shown in FIG. 1, an exemplary computing system 100 includes a user device 110, a recipient device 120, a message recall system 130, a first service provider 150, a second service provider 160, and a third service provider 170. The user device 110, recipient device 120, message recall system 130, first service provider 150, second service provider 160, and third service provider 170 are capable of communicating via a communications network(s) 180. Network 180 might be a single network or multiple networks, as well as being a network of network. A network(s) might comprise, for example, a cable network, the Internet, a wireless network (e.g., a wireless telecommunications network), or a combination thereof or portions thereof. In embodiments, network 180 is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). A wireless telecommunications network might include an array of devices, which are not shown so as to not obscure more relevant aspects of the invention. Components such as a base station, a communications tower, or even access points (as well as other components) can provide wireless connectivity in some embodiments.

The user device 110 and/or the recipient device 120 may take on a variety of forms, such as a personal computer (PC), a laptop computer, a mobile phone, a personal digital assistant (PDA), or any other device that is cable of communicating messages to a service provider(s) or a recipient device(s). Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device and/or a recipient device comprises a wireless or mobile device with which a wireless telecommunications network is utilized for communication. In this regard, the device communicates with other devices using a wireless telecommunications network(s).

The user device 110 is utilized to communicate messages to one or more recipient devices, or recipients associated therewith, via a service provider. As used herein, a message refers to any message that can be communicated to a recipient or a recipient device (e.g., via a service provider) from a user device or user associated therewith. A user can generate a message (i.e., a user-generated message) using a computing device, such as user device 110, that is intended for communication to a recipient(s). In this regard, a user can input a message by way of the user device 110 (or other device), for example, using voice, text, a stylus, motion, or any other means capable of inputting a message that is directed to one or more recipients.

A message might be, for instance, a voicemail message, a social network message, a text message, an instant message, an electronic message, or the like. Messages can be communicated to a recipient(s) or a recipient device(s) via an appropriate service provider. A service provider provides message communication services for a user(s). Among other things, a service provider can facilitate delivery of messages from a user or user device to a recipient or recipient device. By way of example only, a service provider may be a voice provider, a text message provider, a social network provider, an electronic message provider, an instant message provider, or the like. A voice provider provides voice services to users. An exemplary voice provider might be a wireless service provider, such as Sprint®, AT&T®, etc. A text message provider provides text messaging services to users. An exemplary text message provider might be a wireless service provider, such as Sprint®, AT&T®, etc. A social network provider provides social networking services to users. An exemplary social network provider might be, for example, Facebook®, MySpace®, Twitter®, etc. An electronic message provider provides e-mail services to users. An exemplary electronic message provider might be, for example, Hotmail®, Gmail®, etc. An instant message provider provides instant messaging services to users. An exemplary instant messaging provider might be, for example, AOL Instant Messenger. As can be appreciated, in some cases, a service provider can provide more than one type of service. For example, a wireless provider may provide voice and text message services to users.

The recipient device 120 can receive messages communicated from one or more user devices, or users associated therewith. That is, the recipient device 120 can receive or retrieve messages that originate from the user device 110, or a user of the user device 110. Such messages may be received by the recipient device 120 via the network 180 and/or a service provider, such as the first service provider 150, the second service provider 160, or the third service provider 170.

The first service provider 150, the second service provider 160, and the third service provider 170 provide communication services to the user device 110 and/or the recipient device 120. In this regard, such service providers can be used to receive messages from a user device(s) and/or communicate messages to a recipient device(s). The first service provider 150, the second service provider 160, and the third service provider 170 may take on any service provider that provides communication services. As previously mentioned, such service providers may be a voice provider, a text message provider, a social network provider, an electronic message provider, an instant message provider, a combination thereof, or the like.

The message recall system 130 is configured to manage messages associated with a user(s). In this regard, the message recall system 130 enables a user to manage messages generated by the user that are directed to or intended for one or more recipient devices, or recipients associated therewith. Accordingly, although FIG. 1 illustrates a single user device 110 associated with a user, as can be appreciated, the message recall system 130 can be used to manage messages generated by a user utilizing any number of user devices associated with the user. For example, the message recall system 130 can allow a user to manage messages communicated in connection with a mobile device, for example, with which the user generates a voice message, a text message, etc. as well as a personal computer, for example, with which the user generates an email message, an instant message, a social network message, etc. Further, the message recall system 130 can manage any number of messages generated by any number of users.

In embodiments, the message recall system 130 manages messages communicated to or in association with any number of service providers. For example, the message recall system 130 can manage messages sent via a voice provider, a text message provider, an email provider, and a social network provider. In some cases, the message recall system 130 may be a part of or hosted by one of the service providers or a network. In other cases, the message recall system 130 may operate independent from any of the service providers, may reside on a user device, etc.

As shown in FIG. 1, the message recall system 130 includes an account managing component 132, a message capturing component 134, a message managing component 136, an account data store 138, a message data store 140, and a user-preference data store 142. It will be understood by those of ordinary skill in the art that the components illustrated in the message recall system 130 are exemplary in nature and in number and should not be construed as limiting. Any number of components may be employed to achieve the desired functionality within the scope of the embodiments hereof. Further, components may be located on any number of servers or computing devices.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The account managing component 132 is configured to establish and manage user accounts associated with service providers. In this regard, the account managing component 132 can receive account data associated with user accounts established with service providers. Account data refers to data associated with a user account (i.e., an account established for a user that uses a service) established with a service provider. For example, assume the user of user device 110 has user accounts with the first service provider 150, the second service provider 160, and the third service provider 170. In such a case, the account managing component 132 can be used to receive, retrieve, access, identify, or reference account data for each of the user accounts associated with such service providers. Account data may include, for example, a user identifier that identifies an account user (e.g., a user name), a user device identifier that identifies a device associated with an account user (e.g., an IP address, a mobile device number, etc.), a password for an account, an account identifier that identifies a particular account or service provider thereof, and/or the like. Such account data might be input by a user, for example, via the user device 110 or another computing device. Alternatively, account data might be provided via the service provider or identified by the account managing component 132.

In embodiments, a data store, such as account data store 138 can be used to store user account data associated with a user. For instance, the account data store 138 may store an indication of a user account(s) and account data (e.g., user identifier and password) associated therewith in connection with a particular user. Account data store 138 can store account data for any number of users. As discussed more fully below, such account data can be referenced and, thereafter, used to obtain and/or recall messages associated with a corresponding user account.

The message capturing component 134 is configured to capture messages, or message data associated therewith, generated by a user and communicated to a service provider(s) and/or a recipient device(s). Message data refers to data associated with a message that identifies, describes, or indicates a message and/or content thereof. For instance, message data may be an indication of a time and/or date associated with a sent message, a user or user device communicating the message, an intended recipient(s) of the message, content of the message (or a portion thereof), a title of the message, a subject of the message, a message summary, etc.

Messages or message data can be obtained by the message capturing component 134, for instance, via the user device 110, the recipient device 120, the first service provider 150, the second service provider 160, the third service provider 170, and/or the network 180. Accordingly, a message being communicated from the user device 110 can be received, retrieved, or referenced as the message is being communicated to the service provider or recipient device 120 or upon receipt of the message by the service provider or recipient device 120.

A user-generated message may be received and/or stored in connection with a service provider. Accordingly, the message capturing component 134 can obtain the message or associated message data from the corresponding service provider. By way of example only, assume that the user device 110 communicates a text message to the recipient device 120 via the first service provider 150. In such a case, the message might be routed through the first service provider 150 and, thereafter, communicated to the message recall system 130. In such a case, the message capturing component 134 can receive or retrieve the message, or message data associated therewith, from the first service provider 150.

As previously mentioned, messages can be received from a service provider or retrieved from a service provider. In this regard, messages may be pushed from a service provider or messages may be pulled from a service provider. In some embodiments, participating providers might push messages while messages might be pulled from non-participating providers. A participating provider refers to a service provider that operates in connection with the message recall system 130. That is, a participating provider may have an established relationship (e.g., a contractual relationship) with an entity associated with the message recall system 130. For a participating provider, the message capturing component 134 may communicate with the service provider using an established API to send a message with an appropriate user identifier, user password, etc. to capture sent messages. The message capturing component 134 may reference account data, for example, from the account data store 138, and utilize such account data to capture messages. Alternatively, upon receiving a message, a participating service provider may provide the message, or message data, to the message capturing component 134.

A non-participating provider refers to a provider that operates independently from the message recall system 130 in that there is not an established relationship between the non-participating provider and the message recall system 130. For a non-participating provider, the message capturing component 134 may utilize an appropriate user identifier, user password, or login component required by the service provider to capture or request messages sent in association with a user. In such a case, the message capturing component 134 can operate as the user logging into the service provider, for example, and retrieving a message. The message capturing component 134 may reference account data, for example, from the account data store 138, and utilize such account data to capture messages. Although reception and retrieval methods are described in relation to a participating provider and a non-participating provider, any such method, among others, can be used to receive or retrieve messages from a service provider.

In embodiments, a data store, such as message data store 140, can be used to store messages, and/or message data associated therewith, in connection with a user. For instance, the message data store 140 may store each message communicated in association with a particular user. Alternatively, the message data store 140 may store message data associated with each message communicated in connection with a particular user. The message data store 140 can store messages or message data for any number of users.

As can be appreciated, in some embodiments, the message capturing component 134 may be configured to obtain and/or store each message, or data associated therewith, that corresponds with a user. By way of example, the message capturing component 134 might obtain and/or store each message sent by way of a service provider for which the message recall system 130 has account information. In other embodiments, the message capturing component 134 may be configured to obtain and/or store a portion of the messages, or data associated therewith, that correspond with a user. For example, the message capturing component 134 may obtain and/or store messages indicated as high priority, messages of a particular type (e.g., text message, voice message, email message), messages communicated via a particular service provider(s), messages sent at a particular time or within a particular time duration, messages indicated by a user to be captured, or the like.

The message managing component 136 is configured to manage messages communicated in association with a user. In this regard, the message managing component 136 manages messages sent from a user device(s) associated with a user that are delivered to a service provider(s) and/or a recipient device(s). In embodiments, the message managing component 136 manages messages by enabling viewing of sent messages, initiating message recalls, etc. A message recall, as used herein, refers to canceling or deleting a message previously communicated from a user device or user to a recipient device, recipient, and/or a service provider. In this regard, assume that a user provides a social network post via a social network provider (e.g., Facebook®). Further assume that the user wishes to recall the message such that the message can no longer be viewed by recipients. In such a case, the message managing component 126 can be utilized to initiate a message recall for the appropriate message.

Message recalls can be initiated by the message managing component 136 in response to a user providing an indication to recall one or more messages. In some embodiments, an interface, such as an online interface or an interface provided via an application, can be accessed by a user to view messages sent by the user, recall messages, and/or otherwise manage messages. In such an embodiment, the interface may provide a user with sent messages or message data so that the user can view messages communicated from the user. Upon viewing a message(s) or message data, the user may select a recall option associated with a message(s) intended to be recalled. For example, a user may select a message title or other message data and indicate a desire to have the message recalled. As can be appreciated, in some cases, a user may be able to recall a set of messages. For instance, a user may select multiple messages to be recalled or select a category of related messages to be recalled. Messages can be related according to any category, such as, for example, a recipient, a date and/or time of sent messages, a subject of messages, a communication method of messages, etc.

The message managing component 136 can maintain a recall log that includes a history of actions taken with respect to the stored messages. A recall log can be accessible to a user, for example, via a user interface. In this regard, a user can view message actions taken in connection with sent messages. For example, a user may view which sent messages have been recalled, view sent messages, etc. In some cases, even if a message is recalled with respect to a recipient device and/or a service provider, the message may not be deleted from the message recall system such that the user can view the contents of previously sent messages, or data associated therewith. A recall log may also include details regarding deletion of a message(s). For example, a recall log may include an indication of a success or failure of a recall, a date and/or time of a recall, a recipient(s) for which the recall was successful or a failure, whether a recipient(s) viewed a particular message, etc.

By way of example only, and with reference to FIG. 2, FIG. 2 illustrates an exemplary user interface 200 for user access to manage messages. The exemplary user interface 200 includes a set of sent messages 202. Such messages can be organized in any fashion such as, for example, by communication method or service provider, by date/time, by recipient, by subject, etc. Messages may include any number of data, some of which may be displayed initially and some of which may be provided upon selection to view more information (e.g., by selection of a message). For example, as shown in FIG. 2, each message may include a recall option 204, a recipient indication 206, a message subject indication 208, a communication method 210, a date/time indication 212, and/or the like.

To initiate a message recall, the user may provide such an indication. For example, to recall "Message 1" directed to "Recipient 1," the user may select recall option 214 to initiate a recall of "Message 1." To view a "Message 1," the user may select, for example, "Message 1" and thereafter be provided with the message content associated with "Message 1."

FIG. 2 also illustrates a recall log option 216 and a recall by category option 218. The recall log option 216 can be used by a user to view details regarding recalled messages, such as, for example, an indication of a success or failure of a recall, a date and/or time of a recall, a recipient(s) for which the recall was successful or a failure, whether a recipient(s) viewed a particular message, etc. The recall by category option 218 can be used by a user to recall a set of messages based on a particular category. For example, a user might wish to delete messages sent to a particular recipient, sent by a particular communication method (e.g., text messages, social network postings, etc.), sent at a particular time and/or date, etc.

With reference back to FIG. 1, in addition to or in the alternative to an interface, such as an online interface accessible via a website, that can be used to manage messages, a confirmation message can be sent to a user such that the user can initiate a message recall via the confirmation message. A confirmation message refers to a message sent to a user that enables the user to initiate a message recall for a particular message intended for one or more recipients or recipient devices. A confirmation message may include, for example, message content, message date/time, a recipient(s) for the message, an indication of whether the message was viewed by a recipient(s), etc. A confirmation message may also include a recall option, that if selected by the user, initiates a message recall for the corresponding delivered message. As such, to delete a previously sent message, a user may select a recall option (e.g., a link or hyperlink) to initiate deletion of the message.

Accordingly, the message managing component 136 may be configured to generate and communicate confirmation messages, receive indications that a recall option has been selected, and thereafter, initiate deletion of the appropriate message. A confirmation message may be generated upon obtaining a sent message. Such confirmation messages can be delivered using any communication method, such as a voice provider, a social network provider, an electronic message provider, an instant message provider, a text message provider, etc. In some embodiments, message confirmations may be communicated using the same communication method utilized by the user to send the initial message intended to be recalled. For instance, if a text message provider is used to send a text message from a user device to a recipient device, a confirmation message may be sent by way of a text message to the user device. In other embodiments, a predetermined communication method may be used to communicate a message confirmation to a user device, such as a default or preferred service provider (e.g., a text message). For instance, if a voice message is sent from a user device to a recipient device, a confirmation message may be sent by way of a text message to the user device. Message confirmations may be communicated to a user automatically (i.e., without user intervention), in accordance with a user selection to receive a message confirmation, in accordance with a user preference, and/or the like.

As can be appreciated, in embodiments, the message managing component 136 may access a user-preference data store, such as user preference data store 142, to reference preferences of the user. A user preference, as used herein, refers to any user preference related to managing messages. By way of example, a user preference may indicate a message type to capture, a service provider(s) for which to capture messages, message data to be included within a confirmation message, a communication method used to send confirmation messages to the user, a type of message to use to send confirmation messages to the user, a services provider(s) for which to send confirmation messages to the user, and/or the like. Accordingly, upon capturing a message, the message managing component 136 may reference user preferences stored within the user preference data store 142 to determine an appropriate action. In some cases, the message managing component 136 may reference user preferences prior to capturing a message such that a determination can be made as to whether to capture a message and/or message data.

The message managing component 136 can initiate message recalls by communicating with an appropriate service provider to delete a message(s). The method used to initiate message recalls may be based on the service provider or the services provided by the service provider. The message managing component 136 may communicate with the service provider (e.g., a participating provider) using an established API to send a message with an appropriate user identifier, user password, etc. to recall sent messages. The message managing component 136 may reference account data, for example, from the account data store 138, and utilize such account data to initiate a message recall. The message managing component 136 and/or the service provider may recall messages desired to be deleted.

Alternatively, the message managing component 136 may utilize an appropriate user identifier, user password, or login component required by the service provider to recall messages sent in association with a user. In such a case, the message managing component 136 operates as the user logging into the service provider (e.g., a non-participating provider), for example, and deleting a message. The message managing component 136 may reference account data, for example, from the account data store 138, and utilize such account data to capture messages.

Figure 3:
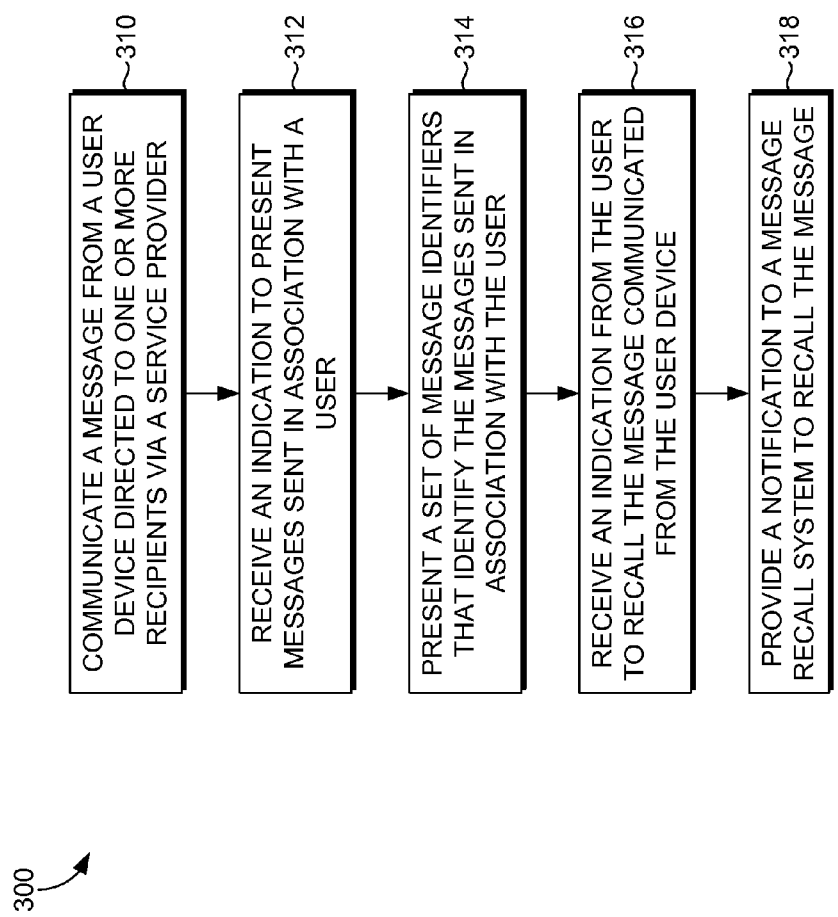
FIG. 3 provides a first exemplary method for facilitating message recalls using a user interface, in accordance with an embodiment of the present invention.

By way of example only, and with reference to FIG. 3, an exemplary method 300 for facilitating message recalls using a user interface (e.g., an online user interface such as a website) is provided. In embodiments, exemplary method 300 can be carried out via a user device or user devices associated with a user. Initially, as indicated at block 310, a message is communicated from a user device that is directed to one or more recipients via a service provider. Such a message may be an email message, a voice message, a text message, a social network message, or the like. At block 312, an indication to present messages sent in association with a user is received. In this regard, a user may login to an online user interface and select to view messages sent by the user. The user may utilize the user device used to communicate the message or utilize another user device to login to the online user interface. In some case, simply logging in to the online user interface provides an indication to view messages sent by the user. Subsequently, at block 314, a set of message identifiers that identify the messages sent in association with the user are presented. In embodiments, the content of the sent messages or any other data related to the sent messages (e.g., a title, a subject, a date/time, a recipient, etc.) may be displayed. An indication from the user to recall the message communicated from the user device is received. This is indicated at block 316. A user might provide an indication to recall the message by selecting the message identifier, message data, a recall option (e.g., a selection box or a recall link), etc. As can be appreciated, the message desired to be recalled may have been communicated in connection with any user device associated with the user. Further, an indication to recall any number of messages may be received. A notification is provided to a message recall system to recall the message, as indicated at block 318. That is, a user device communicates with a message recall system to indicate a user desire to recall a particular message(s).

Figure 4:
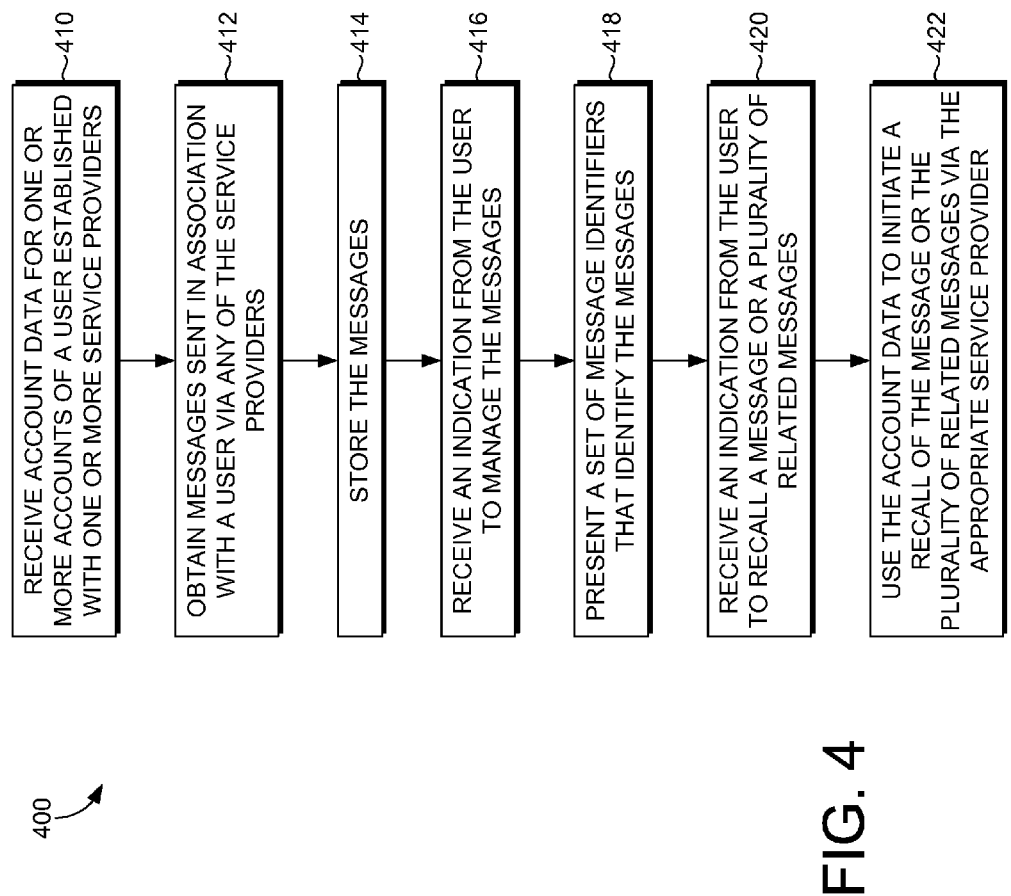
FIG. 4 provides a second exemplary method for facilitating message recalls using a user interface, in accordance with an embodiment of the present invention.

Turning to FIG. 4, an exemplary method 400 for facilitating message recalls using a user interface (e.g., an online user interface such as a website) is provided. In embodiments, exemplary method 400 can be carried out via a message recall system. Initially, as indicated at block 410, account data for one or more accounts of a user established with one or more service providers is received. Account data may include, for example, a user name and a user password. In embodiments, account data is received for an account with a first service provider and an account with a second service provider that is different from the first service provider. At block 412, messages sent in association with a user via any of the service providers are obtained. Messages can be sent from any user device being used by the user to a service provider to be delivered to one or more recipients. Such messages are stored, as indicated at block 414. At block 416, an indication to manage the messages is received from the user. An indication to manage message may be received in any manner, such as, for example, logging in to an online user interface, providing an indication upon logging in to an online user interface, etc. A set of message identifiers that identify the messages are presented. This is indicated at block 418. At block 420, an indication to recall a message or a plurality of related messages is received from the user. The account data is utilized to initiate a recall of the message or the plurality of related messages via the appropriate service provider(s), as indicated at block 422. In this regard, a username and a user password, for example, can be used to communicate with an appropriate service provider(s) to initiate a recall of a message(s). Although FIG. 4 describes obtaining and storing messages, message data associated with messages can be obtained and stored in addition to or in the alternative to messages.

With reference to FIG. 5, an exemplary method 500 for facilitating message recalls using confirmation messages is provided. In embodiments, exemplary method 500 can be carried out via a user device associated with a user. As indicated at block 510, a message is communicated from a user device that is directed to one or more recipients via a service provider. At block 512, a confirmation message is received that includes a recall option to recall the message. Such a recall option may be a link or hyperlink that, if selected, provides an indication of a desire to recall a message. The confirmation message is presented, as indicated at block 514. A confirmation message may be sent to the same user device or a different user device than the user device used to communicate the message. Further, the confirmation message may be sent via the same or different service provider or type of message than the service provider or type of message used for the initial message. A selection of the recall option is received at block 516. A user may select a recall option using any manner, such as hovering a cursor over a link and selecting the link. At block 518, an indication of the selection of the recall option is communicated to a message recall system that can initiate a recall of the message via the service provider.

Turning to FIG. 6, an exemplary method 600 for facilitating message recalls using confirmation messages is provided. In embodiments, the exemplary method 600 can be carried out via a message recall system. Initially, as indicated at block 610, a message sent from a user device to a service provider is obtained. In embodiments, a message sent from a user that is directed to one or more recipients is communicated to the recipients via a service provider. Such a message can be obtained by receiving or retrieving the message from the service provider, for example using account data associated with the service provider. Subsequently, at block 612, a confirmation message is generated that includes a recall option to recall the sent message. The confirmation message is communicated to a user device of the user, as indicated at block 614. At block 616, an indication to recall the sent message is received. A recall of the message is initiated at block 618. For example, account data associated with the service provider can be used to communicate with the service provider to initiate the recall of the message.

Referring now to FIG. 7, an exemplary method 700 for facilitating message recalls is provided. In embodiments, the exemplary method 700 can be carried out via a service provider. As indicated at block 710, a message is received from a user device associated with a user. At block 712, the message is provided to a message recall system. In embodiments, the message is automatically provided to the message recall system (i.e., without user intervention) or is provided to the message recall system based on a request from the message recall system. At block 714, an indication to recall the message is received from the message recall system. Thereafter, at block 716, the message is deleted within the service provider system.

It will be understood by those of ordinary skill in the art that the order of steps shown in the method 300 of FIG. 3, method 400 of FIG. 4, method 500 of FIG. 5, method 600 of FIG. 6, and method 700 of FIG. 7 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need be carried out or need to be carried out in the specific order described.

The invention claimed is:

1. One or more non-transitory computer-readable storage media having computer-useable instructions embodied thereon for performing a method for facilitating message recalls, the method comprising:

receiving an indication that a voice message has been communicated in association with a user device, the indication being received at a message recall system remote from the user device and a recipient device of the voice message;

communicating a confirmation message to the user device, the confirmation message including a recall option that, if selected, initiates a recall of the voice message, wherein the confirmation message is presented among a plurality of confirmation messages having corresponding recall options;

receiving an indication of a user selection of the recall option from among the plurality of confirmation messages having recall options; and initiating the recall of the voice message, wherein the recall of the voice message is initiated by communicating with a service provider that provided voice message services to the user device, and wherein account data associated with the service provider is utilized to initiate the recall of the voice message.

2. The media of claim 1, wherein reception of the voice message, or message data associated therewith, from the service provider provides the indication that the voice message has been communicated in association with the user device.

3. The media of claim 2, wherein the voice message, or message data associated therewith, is received from the service provider in accordance with a request from the message recall system that is remote from the service provider.

4. The media of claim 3, wherein the message recall system uses account data corresponding with the service provider to request the voice message, or message data associated therewith.

5. The media of claim 1, wherein the confirmation message comprises a text message or an electronic message.

6. The media of claim 1, wherein the indication of the user selection of the recall option is provided by a user of the user device.

7. One or more non-transitory computer-readable storage media having computer-useable instructions embodied thereon for performing a method of facilitating message recalls, the method comprising:

obtaining a first message of a first type from a first service provider, the first message associated with a user;

obtaining a second message of a second type from a second service provider, the second message associated with the user, wherein the second type of message is different from the first type of message and comprises a voice message, a text message, an electronic message, an instant message, or a social network message;

receiving an indication to recall the first message;

utilizing account data associated with the first service provider to initiate a recall of the first message that deletes the first message from the first service provider;

receiving an indication to recall the second message; and utilizing account data associated with the second service provider to initiate a recall of the second message that deletes the second message from the second service provider.

8. The media of claim 7, wherein the first type of message comprises a voice message, a text message, an electronic message, an instant message, or a social network message.

9. The media of claim 7, wherein the first message and the second message are sent from one or more user devices associated with the user.

10. The media of claim 7 further comprising presenting the first message and the second message, or indications thereof, to the user via a display screen.

11. The media of claim 10, wherein the user provides the indication to recall the first message via a recall option presented via the display screen.

12. The media of claim 7, wherein a request having the account data is communicated to the first service provider to initiate the recall of the first message, the request providing a request for the first service provider to delete the first message or an indication to the first service provider to delete the first message.

13. The media of claim 7, wherein the account data is used to login to the first service provider and delete the first message.

14. A graphical user interface embodied on at least one non-transitory computer-readable media for recalling messages comprising:

a first display area for simultaneously displaying a set of message identifiers that identify messages sent in association with a user, wherein at least one of the messages comprises a first type of message associated with a first service provider and at least one of the messages comprises a second type of message associated with a second service provider, wherein the second type of message is different from the first type of message and comprises a voice message, a text message, an electronic message, an instant message, or a social network message;

a second display area for displaying a recall option to initiate a recall of one or more messages associated with the set of message identifiers;

a third display area for displaying a recall log that provides details in association with message recalls including an option to view contents of the message recalls.

15. The media of claim 14 further comprising a third display area for displaying a recall log that provides details in association with message recalls.

16. The media of claim 14, wherein the first type of message comprises a voice message, a text message, an electronic message, an instant message, or a social network message.

* * * * *